United States Patent

Müller-Rees et al.

[11] Patent Number: 5,851,604
[45] Date of Patent: Dec. 22, 1998

[54] INTERFERENCE PIGMENTS COMPRISING MOLECULES FIXED IN A CHOLESTERIC CONFIGURATION, AND USE THEREOF

[75] Inventors: Christoph Müller-Rees, Pullach; Silvia Jung, München; Johann Doppelberger, Emmerting; Walter Goeblmeier, Rogglfing, all of Germany

[73] Assignee: Consortium fur elektrochemische Industrie GmbH, Munich, Germany

[21] Appl. No.: 432,298

[22] Filed: May 1, 1995

[30] Foreign Application Priority Data

May 6, 1994 [DE] Germany ............ 44 16 191.3

[51] Int. Cl.$^6$ ............... B32B 5/16; C09B 19/00
[52] U.S. Cl. .......... 428/1; 255/299.01; 428/327; 428/333; 428/402; 428/447; 428/910; 428/913; 428/916
[58] Field of Search ............. 428/402, 1, 327, 428/333, 447, 910, 913, 916; 252/299.01

[56] References Cited

U.S. PATENT DOCUMENTS

| 4,388,453 | 6/1983 | Finkelmann et al. | 528/15 |
| 4,410,570 | 10/1983 | Kreuzer et al. | 427/374.1 |
| 4,780,383 | 10/1988 | Garrett et al. | 430/11 |
| 5,098,978 | 3/1992 | Riepl et al. | 528/15 |
| 5,211,877 | 5/1993 | Andrejewski et al. | 252/299.01 |
| 5,242,617 | 9/1993 | Metzger et al. | 252/299.5 |
| 5,362,315 | 11/1994 | Müller-Rees et al. | 106/493 |
| 5,364,467 | 11/1994 | Schmid et al. | 106/404 |
| 5,364,557 | 11/1994 | Faris | 252/299.01 |
| 5,378,393 | 1/1995 | Chen et al. | 252/299.01 |

FOREIGN PATENT DOCUMENTS

| 2032587 | 6/1991 | Canada . |
| 0060335 | 9/1982 | European Pat. Off. . |
| 0066137 | 12/1982 | European Pat. Off. . |
| 0342533 | 11/1989 | European Pat. Off. . |
| 0358208 | 3/1990 | European Pat. Off. . |
| 0383376 | 8/1990 | European Pat. Off. . |
| 0601483 | 6/1994 | European Pat. Off. . |
| 2133897 | 12/1972 | France . |
| 3110048 | 9/1982 | Germany . |
| 3604757 | 9/1986 | Germany . |
| 3942663 | 6/1991 | Germany . |
| 4217511 | 12/1993 | Germany . |
| 1372066 | 10/1971 | United Kingdom . |
| 9308237 | 4/1993 | WIPO . |

Primary Examiner—Hoa T. Le
Attorney, Agent, or Firm—Brooks & Kushman P.C.

[57] ABSTRACT

The invention relates to interference pigments comprising molecules fixed in a cholesteric configuration, and to the use thereof. The pigments of the invention have a plateletlike structure and a thick ness of from 1 $\mu$m to 20 $\mu$m. They contain oriented, crosslinked substances with a liquid-crystalline structure having a chiral phase.

7 Claims, No Drawings

INTERFERENCE PIGMENTS COMPRISING MOLECULES FIXED IN A CHOLESTERIC CONFIGURATION, AND USE THEREOF

FIELD OF INVENTION

The invention relates to interference pigments comprising molecules fixed in a cholesteric configuration, and to the use thereof.

BACKGROUND OF INVENTION

In addition to the long-widespread color pigments which absorb a fraction of the incident light and reflect the remainder, there is increasing use of pigments which owe their color to interference effects. These pigments are known as pearl luster pigments and are composed of mica platelets to which thin layers of materials having a different optical density have been applied. So that color effects can be produced in the visible wavelength region, it is necessary to use layer thicknesses in the region of a few hundred nanometers, which must be matched exactly from layer to layer.

In Merck Kontakte 1992 (2), p. 23, model calculations are used to demonstrate how the originally sharply defined reflection spectrum of a $TiO_2$-mica-$TiO_2$ system becomes "blurred" over the entire visible wavelength region if the layer thicknesses of the mica substrate, instead of being exactly defined, show a Lorenz distribution. The same publication (FIG. 10, page 20) shows reflection curves of the system at different thicknesses of the $TiO_2$ layer, the marked effect of the layer thicknesses on the form of the curves (intensity and width of the curves) and on the position in the spectrum of light is very evident, and results in very different color effects. The same publication (FIG. 11, page 20) shows the set of reflection curves for a selected $TiO_2$-mica-$TiO_2$ system at different viewing angles (angle of illumination corresponds to viewing angle), owing to the laws of refraction which arise in the case of interference phenomena with light, the curves with a relatively flat viewing angle are displaced toward shorter-wave regions of the spectrum, although all of the reflection curves overlap to a considerable extent. In these model calculations it is necessary to take account of higher-order interference curves, so that a given layer system possesses two or more reflection maxima which may be situated in the visible region and which contribute to the overall color impression. For these reasons a layer system of this kind is not ideally colorless but is milky-white, and at different viewing angles (angle of illumination corresponds to viewing angle, "gloss or reflection condition") no definite change in color can be observed, owing to the overlapping of the wide reflection curves. If, in contrast, the system is viewed at an angle which deviates greatly from the angle of illumination (angular region far outside the "gloss condition"), then in this geometry ("in transmission") the complementary fraction of the light spectrum can be seen.

The application of two or more layers of materials with different refractive indices to a substrate enables higher reflection intensities with narrower curves to be obtained, as shown in FIG. 15 (page 21 of the above publication). However, even in this example, only a small region of the red light spectrum, from about 610 nm to 650 nm, occurs without reflection components in the reflection spectrum.

A common feature of all of these model calculations is that they start from defined layer thicknesses which extend homogeneously over the entire pigment. The consequence of this for production processes is a need to maintain precise conditions.

In EP-A-0 342 533, for example, interference pigments of this kind are prepared by applying metal oxide layers to natural mica platelets which are immersed in an aqueous solution of metal compounds and then dried at temperatures of from 80° C. to 130° C.

In contrast, DE-A-42 17 511 describes a process in the gas phase, wherein metal compounds are applied by vapor in a fluidized-bed reactor. In both cases, the individual layers are subject to variations in thickness which lead to the color variations discussed.

In WO 93/08237 the fluctuation in thickness which is unavoidable in the case of natural mica is countered by a process which leads to better-defined $SiO_2$ layers by forming a thin silicate film as precursor material and then drying it. However, this process also has the disadvantage that it is necessary subsequently to coat this carrier substrate with compounds in layer thicknesses which must be maintained precisely, by a set-chemical method or by methods as described in the above-discussed EP-A-0 342 533. Thus in this example, it is not always possible to bring about a precisely defined ratio of layer thickness of substrate layers to metal (oxide) layer(s). Furthermore, the metal compounds which are required in the precursor step for the preparation of conventional interference pigments are frequently toxic and give rise to problems of workplace safety.

As Is known from H. -J. Eberle, A. Miller and F. -H. Kreuzer, Liquid Crystals, 1989 (5), 907–916 it is possible to produce novel color effects using liquid-crystalline materials whose molecules are arranged in layers which are twisted with respect to one another (cholesteric liquid crystals with a helical structure): interference effects with light mean that a very narrow range of the beam of light which is incident in a broad spectral region is reflected, whereas all wavelengths lying outside this range are transmitted. In this context, the range of the reflected spectral component is predetermined by the pitch of the helix and the mean refractive index of the material. The half width of the reflection curve is dependent on the molecular refractive-index anisotropy. In addition, the reflected spectral region is divided into a left-handed-and a right-handed-helically polarized light component, one which reflects and the other transmits depending on the twist sense of the helix.

As shown for interference pigments, in the case of cholesteric liquid crystals the position of the reflection spectrum is shifted in analogy to Bragg's Law toward the short-wave region when illumination and observation are carried out at flatter angles. In contrast to the interference pigments described, in the case of cholesteric liquid crystals based on organopolysiloxanes, which, as shown in Eberle et al., have been applied as a film to substrate materials, reflection curves of high intensity with narrow half widths can be obtained. In this case, reflection components are absent from broad regions of the spectrum, including the visible region, so that outside the reflection curves of the liquid crystals a baseline prevails with no reflection components. Since in the region of reflection it is only the left-handed-helically polarized light components which are reflected, while the right-handed-helically polarized components as well as the rest of the light spectrum are completely transmitted, these cholesteric materials are transparent over the entire spectral range.

Because of the narrow half widths of the reflection curves in systems of this kind it is possible to achieve high brilliance and good color saturation, even under unfavorable light conditions, owing to the marked rise of the reflection curves from the background. Since these curves overlap at different viewing angles under gloss angle conditions either not at all or only in small fractions (FIG. 5a in Eberle et al.), other spectral regions are overlapped by the reflection curve even in the case of relatively small changes in angle, which regions do not include the original regions; in the spectral region in which the "old" reflection curve had its wavelength maximum, the "new" reflection curve goes right back to the baseline. This results in a marked color perception which changes continuously with the viewing angle ("continuous color flop") and differs fundamentally from the above-discussed color flop of conventional interference pigments based on the reflection/transmission condition.

If the cholesteric organosiloxanes are applied to colored substrates, it is possible to obtain a great diversity of color effects, whereas a black substrate absorbs completely the light component which is transmitted by the cholesterically configured molecules, with a white substrate the effect is the opposite, the spectrally and spatially diffuse light component of the white substrate competes with the directed spectral component of the cholesteric phase. When colored substrates are used the absorption spectra overlap accordingly with the reflection spectra of the helical structures, which may lead to angle-dependent blue shifts and even inverse red shifts at relatively flat viewing angles, as Eberle et al., showed using different examples in FIG. 9, Thus, it is possible with red liquid-crystalline material on a dark blue substrate to obtain an angle-dependent color shift which is opposite to that for a green substrate. With an almost perpendicular angle of illumination/viewing angle this leads on the blue substrate to a violet signal and on the green substrate to an orange-colored signal. In contrast, at flatter angles of illumination/viewing the color impression on the green substrate shifts to the green region, corresponding to a shift into the short-wave region of the spectrum. On the blue substrates a turquoise color is formed from the blue absorption color and the green color of the liquid-crystalline material, corresponding to a shift into the long-wave spectral region in relation to the violet color. When red liquid-crystal materials are used on a red substrate, an intensification of color occurs at specific, virtually perpendicular viewing angles, whereas at flatter angles the color flop of the liquid crystal leads to a green color effect which is superimposed on the angle-independent, red absorption color of the substrate and therefore gives an orange color impression.

Since the reflection curves of the liquid-crystalline organosiloxanes are on the baseline in broad regions of the visible light spectrum, these regions are "free" for other chromophoric media (pigments, colorants), thus enabling very diverse combinations which may lead to flop intensities and color effects which are always novel. In this context it is irrelevant whether pigments are additionally incorporated into the liquid-crystalline composition or whether a colored substrate is chosen, as is shown for the yellow cholesteric organosiloxane material in FIG. 9 (Eberle et al.,) by way of example.

A common factor with all these applications is that the color effect which can be observed in the case of the cholesteric organosiloxanes is only possible within temperature ranges in which the molecules are arranged in helical layers. This temperature range is predetermined by the material. If the material is heated at temperatures situated above this phase range, then the ordered structure becomes disordered, with the result that the constructive interference effects with light which are described are no longer possible; the originally colored material becomes colorless.

U.S. Pat. No. 5,211,877 describes materials which retain the characteristic optical properties even outside the liquid-crystalline phase region, following the formation of helically twisted layers these molecules are fixed with the aid of a chemical polymerization reaction, so that these layers are maintained even in temperature ranges outside the liquid-crystalline phase. However, this method requires a planar substrate on which the base layer for the helical structure is able to form; consequently, only planar surfaces can be given color effects of this kind.

SUMMARY OF INVENTION

The object of the present invention was to provide materials which give brilliant color impressions, changing continuously with the viewing angle, if desired additionally in the UV and IR region, and which can be employed universally with conventional methods of application.

The present invention relates to pigments of platelet like structure having a thickness of from 1 $\mu$m to 20 $\mu$m comprising oriented crosslinked substances with a liquid-crystalline structure having a chiral phase.

The pigments according to the invention possess the optical properties of the liquid-crystalline phase (angle-dependent, continuously changing color effect, high brilliance and polarization of reflected light component). Incorporated into conventional binder systems, they can be applied to any desired surfaces, including nonplanar surfaces.

Pigments comprising oriented, three-dimensionally crosslinked substances with a liquid-crystalline structure having a chiral phase can be incorporated, individually or in any desired mixture, into a wide range of media using conventional, established process steps.

Examples of such media are waterborne coating materials in the form of aqueous dispersions, such as PMA (polymethacrylate), SA (styreneacrylate), polyvinyl derivatives, PVC (polyvinylchloride), polyvinylidene chloride, SB copolymers (impact resistant polystyrine), PV-AC (polyvinyl acetate) copolymer resins, or in the form of water-soluble binders, such as shellac, maleic resins, rosin-modified phenolic resins, linear and branched saturated polyesters, amino resin-crosslinking saturated polyesters, fatty acid-modified alkyd resins, plasticized urea resins, or in the form of water-thinnable binders such as PU (polyurethane) dispersions, EP (epoxy) resins, urea resins, melamine resins, phenolic resins, alkyd resins, alkyd resin emulsions, silicone resin emulsions, and also powder coatings, for example, for triboelectric spraying, such as polyester powder coating resins, PU powder coating resins, EP powder coating resins, EP/SP (epoxy-polyester) hydrid powder coating resins, PMA powder coating resins or powder coatings for fluidized-bed sintering, such as thermoplasticized EPS (extruded polystyrene), LDPE (low density polyethylene), LLDPE (linear low density polyethylene), HDPE (high density polyethylene), and solvent-containing coating materials, for example as one-component and two-component (two-pack) coating materials (binders) such as shellac, rosin esters, maleic resins, nitrocelluloses, rosin-modified phenolic resins, physically drying saturated polyesters, amino resin-crosslinking saturated polyesters, isocyanate-crosslinking saturated polyesters, autocrosslinking saturated polyesters, alkyds with saturated fatty acids, linseed oil alkyd resins, soya oil resins, sunflower oil alkyd resins, safflower oil alkyd resins, ricinenic alkyd resins, wood oil/linseed oil alkyd resins, mixed oil alkyd resins, resin-modified alkyd resins, styrene/vinyltoluene-modified alkyd resins, acrylicized alkyd resins, urethane-modified alkyd resins, silicone-modified alkyd resins, epoxide-modified alkyd resins, isophthalic acid alkyd resins, nonplasticized urea resins, plasticized urea resins, melamine resins, polyvinyl acetals, noncrosslinking P(M)A homo- and copolymers, noncrosslinking P(M)A homo- and copolymers with nonacrylic monomers, autocrosslinking P(M)A homo- and copolymers, P(M)A copolymers with other nonacrylic monomers, P(M)A homo- and copolymers which crosslink by means of external crosslinking agents, P(M)A copolymers with nonacrylic monomers and which crosslink by means of external crosslinking agents, acrylate copolymer resins, unsaturated hydrocarbon resins, cellulose compounds which are soluble in organic solvents, silicone combination resins, PU resins, P resins, peroxide-curing unsaturated synthetic resins, radiation-curing synthetic resins containing photoinitiator, radiation-curing synthetic resins without photoinitiator, and also solvent-free coating materials (binders), such as isocyanate-crosslinking saturated polyesters, PU 2-pack resin systems, moisture-curing PU 1-component resin systems, EP resins and plastics, individually or in combination, such as acrylonitrile-butadiene-styrene copolymers, cellulose acetate, cellulose acetobutyrate, cellulose acetopropionate, cellulose nitrate, cellulose propionate, artificial horn, epoxy resins, polyamide, polycarbonate, polyethylene, polybutylene terephthalate, poly-ethylene terephthalate, polymethyl methacrylate, polypropylene, polystyrene, polytetrafluoroethylene, polyvinyl chloride, polyvinylidene chloride, polyurethane, styrene-acrylonitrile copolymers, and unsaturated polyester resins as granules, powders or casting resin.

By means of the pigments comprising oriented, three-dimensionally crosslinked substances with a liquid-crystalling structure having a chiral phase, the outstanding optical properties discussed above for the organosiloxanes, can for the first time be realized in countless applications using conventional techniques which are readily accessible to the person skilled in the art. The effects described are reassembled to a certain extent like a mosaic with each individual pigment in the binder system.

By combining these pigments with one another and/or with conventional color pigments it is possible to achieve very diverse color effects on any desired surfaces, which, given by the completely transparent character of the liquid-crystal pigments in broad regions of the light spectrum, brings about a depth effect of the gloss exceeding any effects previously realized.

Owing to their density, which is low in comparison with inorganic pigments, the pigments of the invention have a lesser tendency toward settling and separating in numerous binder systems.

The present invention also relates to compositions which include pigments comprising oriented, three-dimensionally crosslinked substances with a liquid-crystalline structure having a chiral phase.

Suitable starting substances for the preparation of the pigments according to the invention are liquid-crystalline substances which possess a twisted structure with a pitch corresponding to the wavelength of light in the range from UV to IR. Liquid-crystalline substances having a chiral phase, which possess a twisted structure with a desired pitch, may be obtained from nematic, smectic or discotic structures by adding a chiral substance to them. The nature and proportion of the chiral substance determine the pitch of the twisted structure and therefore the wavelength of the light reflected. The twisting of the structure may be either left-handed or right-handed. The starting substances must contain groups which can be polymerized by addition polymerization, polycondensation or polyaddition, at least some of which are in the form of difunctional, trifunctional or higher polyfunctional units. Examples of such systems are methacryloyloxy and acryloyloxy groups.

Examples of suitable materials and their preparation are described in DE-C2-3,604,757, in EP-A2-358,208, in EP-A-0 066 137 (corresponding to U.S. Pat. No. 4,388,453), or in the literature cited by D. J. Broer et al., in 14. Int. Liquid Conf., Abstracts II, 921 (1992).

Three-dimensionally crosslinkable polyorganosiloxanes as in EP-A-358,208 are preferably suitable.

It is, however, possible in principle to use all cholesteric liquid crystals as starting substances for the preparation of the pigments according to the invention. One type of cholesteric liquid crystal or a mixture of at least two of these liquid crystals may be employed; one dye or mixtures of at least two dyes may be employed.

In a preferred embodiment the dye to be employed is a pigment.

In a further preferred embodiment the dye to be employed in the process according to the invention is soluble in the liquid crystal (mixture) used. In the process of the invention it is preferred to employ not a mixture of two or more cholesteric liquid-crystalline substances but rather a single, pure, cholesteric liquid-crystalline substance.

Admixing of the pigments and/or dyes to the other starting substances takes place in a conventional manner, for example by adding them with stirring. In the pigment according to the invention, the admixing of the dyes and/or pigments results in a combination of the angle-dependent color effects of the liquid-crystalline substances with the known color effect(s) of the particular substances admixed. However, the admixing of these substances in no way alters the further process steps for the preparation of the pigments according to the invention.

The pigment color desired in a particular case may also be obtained by mixing defined liquid-crystal base mixtures in appropriate quantitative ratios. In this case there is no change in the further process steps for the preparation of the pigments according to the invention. The further description of the preparation process therefore applies to all variants of the pigments according to the invention.

Substances having a liquid-crystalline structure with twisted phases do not develop their optical characteristics until the individual molecules are arranged in layers and are uniformly ordered within a layer. The molecules change their preferred direction from layer to layer, so that helical structures are formed. In order to achieve this, the molecules are oriented by means of known methods, such as, by means of orientation layers or electric or magnetic field. Such methods are known from the following references: CA113 (22), 201523y; CA113 (14), 124523u; CA112 (18), 169216s; CA112( (16), 149138q; CA112 (4), 21552c; CA111 (16), 144258y; CA111 (4), 24780r.

In the preparation of the pigments according to the invention the starting substances mentioned are oriented in a known manner. This can be accomplished, by knife-coating them onto a backing made of metal, plastic or glass. This backing may have been provided, if desired, with an orientation layer of polyimide or polyvinyl alcohol. If may also have been silanized for this purpose. However, it is also possible to shear the starting substance between two sheets. Preferably, one or two polyethylene terephthalate sheets are used. Orientation of the cholesteric liquid-crystalline molecules using two sheets leads to better orientation of the molecules and thus, ultimately, to pigments having an improved color effect. The knife-coating of liquid-crystalline polyorganosiloxanes onto a sheet is known, for example, from EP-A-358,208.

Crosslinking of the oriented liquid-crystalline substances is carried out as disclosed for the material in question from the prior art. Thus, liquid-crystalline polyorganosiloxanes can be crosslinked thermally by the method described in EP-A-66 137. The liquid-crystalline polyorganosiloxanes described in EP-A-358 208 can be three-dimensionally crosslinked by photochemical means, for example by irradiation with UV light.

A review of methods of crosslinking oriented starting materials photochemically can be found in C. G. Roffey, Photopolymerization of Surface Coatings, (1982) John Wiley & Sons, Chichester, pp. 137–208.

The crosslinked oriented liquid-crystalline substances having a chiral phase are, if desired, removed from the backing. If a sheet is used as the backing, mechanical removal of the brittle crosslinked liquid crystals from the backing can be accomplished, for example, by guiding the backing over a deflecting roller of small diameter. This results in the crosslinked material flaking off from the sheet. However, any other method by which the polymerized material can be removed from the backing is also suitable.

The oriented three-dimensionally crosslinked support-free liquid-crystalline material is comminuted to the particle size desired in each case. This can be effected by milling in universal mills or by rolling in roll apparatus. Depending on the desired application of the pigments, particles sizes having a diameter of from about 10 mm up to 1 $\mu$m can be prepared. The pigments preferably have a particle size of between 500 $\mu$m and 5 $\mu$m. The pigments have a thickness of between 1 $\mu$m and 20 $\mu$m, preferably from 1 $\mu$m to 15 $\mu$m and more preferably from 3 $\mu$m to 10 $\mu$m.

For pigments having a thickness of below 1 $\mu$m effective color is weakened, whereas above a thickness of 20 $\mu$m the homogeneous orientation of the molecules to cholesteric layers is reduced.

In order to narrow the particle size distribution, the millbase can subsequently be classified, for example by screening. Pigments whose thickness is no different from the platelet diameter do not adopt a uniformly parallel orientation with respect to the surface in the binder systems or plastics, so that the cholesteric molecular layers present in the pigments are oriented in random spatial distribution. This results in a weakening of the angle-dependent color flop. Pigments having a very large platelet diameter may cause unevenness in the applied binder system, leading to a reduction in gloss.

Consequently, as a result of their good processability, platelet-like pigments in particular having a layer thickness of from 3 $\mu$m to 10 $\mu$m and a platelet diameter of from 10 $\mu$m to 100 $\mu$m are particularly suitable for the above mentioned applications.

Appropriate admixing of an organopolysiloxane with two monomeric substances to coloring formulations gives access to precursor materials for pigments of the entire visible spectral range, the only variation being in the proportions of the monomer substances added. It is possible to prepare pigments which cover a wide spectral range while at the same time having only marginal differences in their chemical and physical properties. Thus uniform test methods for this pigment class are possible for the particular application desired, leading to considerable savings in, for example, the application of production-line auto finishes.

The entirely synthetic preparation of these precursor materials is regarded as a further advantage, since there are none of the fluctuations in quality which are observed, for example, with natural mica platelets from different deposits. The precursor materials of liquid-crystalline systems which are suitable for the preparation of the pigments according to the invention are based on organic starting materials, so that there are no problems with impurities, especially toxic impurities, as are encountered with inorganic materials, which may even in some circumstances lead to a reduction in the purity of color of the precursor material.

The pigments according to the invention contain no problematic metals or compounds, with the result that no problems are to be expected even in the disposal of binder systems comprising pigments according to the invention.

The specific optical properties of twisted layer systems occur only when the molecules have, in a defined temperature range, become oriented in layers which are twisted with respect to one another. A number of processes are suitable for this in the context of the present invention, and it is possible to employ even support-free methods which lead to the described orientation of the molecules.

Because of the interference interaction with light, a plurality of mutually twisted layers lying on top of one another are required in order to obtain a high intensity of reflection. In this context, heterogeneities of layer thicknesses in the precursor film can be tolerated on condition that the molecules are oriented to form a helical layer. This is assured in the layer thickness range of a few $\mu$m. For this reason the precise maintenance of a layer thickness in the range of a few $\mu$m, in contrast to the processes for the preparation of multi-layer interference pigments, is not absolutely necessary for the preparation of the pigments according to the invention. The process steps for the preparation of the precursor film therefore permit relatively large tolerances for layer thicknesses.

The pigments according to the invention with the viewing angle-dependent color impressions can be incorporated into water-thinnable coating systems or waterborne coating systems by using known methods to effect a dispersion which assures the uniform wetting of the pigments with the binder. Because of their chemical structure (organic materials) there are none of the problems with water (chemical reactions) which are observed in the case of many conventional inorganic pigments or metallic aluminum flakes. Moreover, the pigments according to the invention have no inherent electrical conductivity to interfere with specific applications and are resistant to alkalis and acid.

Powder coating systems and high-solids systems are likewise suitable as binders into which the pigments of the invention can be incorporated, since, owing to the crosslinking reaction, the molecular layer structure of the pigments is preserved over a broad temperature range. In conventional solventborne coating systems such as nitrocelluloses, alkyd, thermoplastic-acrylic, urethane acrylic, polyurethane acrylic or polyester systems—whether they are physically and/or chemically drying systems—and in colored glazes of any desired composition, the color effects described can equally well be obtained.

A particular advantage in photocrosslinkable coating systems is the fact that the pigments described are transparent over a broad wavelength range, since the light in the near UV region (UV A) which is required at the beginning of the photoreaction is not absorbed by the pigments.

Furthermore, the pigments can be incorporated into natural resin coating materials or solvent-free coating materials or in binders as used in printing inks for screen printing or gravure printing.

For the coating of metallic surfaces by means of the coil-coating method, the liquid-crystal pigments can be used without problems in acrylic ester, polyester or silicone-polyester coating systems. They can also be incorporated into plastics or into cosmetic products. In plastics, it is irrelevant whether they are incorporated into a casting resin, powder or granules. Examples of suitable systems are acrylonitrile-butadiene-styrene copolymers, cellulose acetate, cellulose acetobutyrate, cellulose acetopropionate, cellulose nitrate, cellulose propionate, artificial horn, epoxy resins, polyamide, polycarbonate, polyethylene, polybutylene terephthalate, polyethylene terephthalate, polymethyl methacrylate, polypropylene, polystyrene, polytetrafluoroethylene, polyvinyl chloride, polyvinylidene chloride, polyurethane, styrene-acrylonitrile copolymers, unsaturated polyester resins or combinations thereof.

For the color effects described, achieved by means of the pigments according to the invention, to develop on any desired substrates it is necessary for the twisted molecular layers present in each individual pigment to be arranged as uniformly as possible over relatively large surface areas, resulting in a homogeneous spatial orientation of the helical axes. A homogeneous spatial orientation of the helical axes is assured in particular when the plateletlike pigments of the invention are aligned parallel to one another.

The greater the shape factor, i.e., the greater the differentiation of two dimensions of a pigment from the third; the easier it is to achieve a highly uniform orientation of the pigments.

It is therefore advantageous to employ, for the pigments which are incorporated into binders or other substances, processing methods which assure uniform orientation of the pigments according to the invention. It is not important whether these methods are manual or use automatic auxiliary equipment or are possibly employed, in addition, under electrostatic conditions.

The pigments according to the invention which are incorporated into a binder system or into another material, for example a bulk medium, can be oriented by methods in which shear forces are exerted. Examples of such orientation methods are spraying, knife coating, rolling, brushing, air brushing, sprinkling, dipping, flow coating, printing (screen printing, gravure printing, pad printing, flexographic printing, offset printing), casting (rotomolding, injection molding), extrusion (single-screw extrusion, twin-screw extrusion, coextrusion), blowing (film blowing, blowmolding), calendering, dry coating, fluidized-bed sintering, triboelectric coating, electrostatic spraying, electrostatic coating, or lamination. More preferred orientation methods in binders are atomization, spraying, printing and knife coating. Use of these means of orienting pigment produces the angle-dependent color effect with helically polarized light just as well as on a cholesteric liquid-crystal layer applied to a planar substrate.

If the pigments according to the invention are used to create color effects, then a great diversity of possible applications present themselves: in the vehicle sector (land vehicles, motor vehicles, rail vehicles, aircraft, water craft, bicycles) along with the accessories, in the leisure, sports and games sector, in the cosmetics sector, in the textile, leatherwear or jewelry sector, in the gift sector, in writing utensils, packaging or spectacle frames, in the construction sector (for example for interior walls, interior paneling, exterior facing, wall coverings, doors and windows) and in the household sector (for example for furniture, crockery, pots and pans and household implements). The pigments can also be used to obtain novel color effects in printed products of all kinds. for example cardboard and other packaging, carrier bags, paper products, labels and sheets.

Owing to the transparent properties of the pigments in all binder systems and bulk systems, an impression similar to pearl luster pigments of deep gloss of previously unobtained intensity, is manifested in an extremely high perception of brilliance even under poor light conditions.

The pronounced angle-dependent color effects with polarization of light can also be employed to particularly good effect in the area of security marking and of protection against forged color copies. Owing to the diversity of the reflection wavelengths which can be obtained, from the UV to the IR region, and to the possible combinations of diverse pigments of the invention with one another and with other pigments, it is possible to secure against forgery documents of all kinds, bank notes, check cards or other cashless means of payment or certificates. Since the pigments of the invention can be processed by known printing techniques, it is possible to produce data carriers with security elements which offer the same advantages as those described in DE 39 42 66 31 A1. The pigments according to the invention make it much easier to produce such data carriers. The invention therefore also relates to data carriers comprising pigments according to the invention.

Objects coated with conventional absorption pigments have a dull appearance, whereas the same objects appear to be "alive" when coated with a layer of paint into which pigments of the invention having the same color have been incorporated. Using specific color combinations it is possible to intensify or to attenuate the angle-dependent color effets.

Depending on the function of the pigments according to the invention, there are a number of possible layer structures with which the desired effects can be achieved. The simplest system is a one-layer structure in which the pigments is incorporated into a binder and applied. This is possible especially for layer thicknesses above 10 $\mu$m to 20 $\mu$m, for example in the screen printing technique. However, a binder surface whose shape is not ideally smooth results in diffuse reflection at the interface between binder and air, so that the directed reflection brought about by the pigments according to the invention is overlaid by the diffuse reflection, leading to an attenuation of the color effect.

This disadvantage can be countered by covering the pigment-binder layer with a clear coat, leading to brilliant color effects which are substantially more pronounced. The color effects may be further intensified by placing chromophoric layer beneath the two-layer system consisting of novel pigment in binder and of clear coat. An alternative option is to incorporate further color pigments into the binder, so that the hiding power is increased and the color effects described can be obtained independently of the color of the substrate. The only requirement is to ensure that the pigments of the invention in the dry binder system are not completely covered by absorbing pigments which face the light source.

If pigments of the invention which reflect in different wavelength regions are mixed in the binder system, then it is possible to produce color effects from composite colors of the individual pigments. By adding metallic pigments (for example aluminum flakes) or pearl luster pigments, the effects lead, depending on the weighting of the individual classes, to surprising results. Depending on the application the pigments of the invention may be prepared and employed in a very wide range of particle sizes and particle-size distributions.

Coarse particles, for example those having a platelet diameter of greater than 100 μm, bring about a tinsel like, glittering effect without any pronounced hiding power. Finely ground particles on the other hand, for example those having a platelet diameter of about 10 μm, give a hiding power with reduced specific brilliance, especially when they are not arranged parallel to one another in the binder system and when the helical axes of the cholesterically configured layers are arranged heterogeneously in space.

By the combination of both effects it is thus possible to obtain a high hiding power in conjunction with a glitter effect which resembles brilliance. In such systems the color changes depending on the viewing angle, an effect which is particularly highly pronounced for curved, moving objects. Pretreated substrates (for example functional layers such as rustproofing coats) can also be provided with the optical effects in accordance with the structure described.

The following examples serve to illustrate the invention in more detail. Examples 1 to 4 describe pigment preparation, Examples 5 to 12 describe representatives of different binder system, Examples 13 to 18 describe methods for the orientation of the pigments according to the invention in binder system, and Examples 19 to 25 describe applications of the pigments of the invention in a special-effect function. Examples 26 to 35 present different color layer systems.

EXAMPLE 1

A: Polyorganosiloxanes With Side Chains Containing Methacrylic Acid

A solution of 233 g of cholesterol 4-(prop-2-en-1-oxy/benzoate (obtainable in accordance with DE-A 31 10 048), 178 g of 4-trimethylsiloxyphenyl 4-(prop-2en-1-oxy) benzoate (obtainable in accordance with EP-A-358 208, page 9, section C) and 56.9 g of tetramethylcyclotetrasiloxane in 400 ml of toluene was boiled under reflux in the presence of 24 mg of dicyclopentadienylplatinum dichloride for 1 hour and, after addition of a solution of 1.2 g of NaOH in 50 ml of ethanol, for an additional 7 hours in order to cleave the silyl ether. The reaction mixture was concentrated to ⅓ of its volume in a rotary evaporator, 7.5 g of p-toluensulfonic acid and 154 g of methacrylic anhydride were added, and the mixture was heated at 100° C. for 1 hour. After the volatile constituents had been distilled off, the residue was reprecipitated twice with methylene chloride/ethanol.

The product had the following physical and thermodynamic data: glass transition temperatures: 14° C., clearing point: 141° C.

B: Preparation of a Pigment 4 g of the polyorganosiloxane prepared as described in A were heated to 70° C. and mixed with 0.11 g of 2-methyl-1-[4-(methylthio)phenyl]-2-morpholino-1-propanone (obtainable under the name Irgacure 907 from Ciba Marienberg GmbH, 6140 Bensheim 1) with stirring until a homogeneous mixture was obtained. This gave a viscous LC composition having a reddish shimmer. The liquid-crystalline material was knife-coated at 120° C. onto a polyethylene terephthalate sheet (Hoechst AG, Geschaftsbereich Folien, 6200 Wiesbaden 1) in layer thicknesses of 7 μm, with the sheet being advanced under the fixed knife at a running speed of about 2 m/min. Owing to the shear gradient between knife and sheet the liquid-crystalline molecules were simultaneously oriented, which become evident by a red coloration of the liquid-crystal layer. This layer was subsequently irradiated using a mercury discharge lamp (80 W/cm) for 5 seconds and thus was three-dimensionally crosslinked. The film produced on the sheet was tack-free and brittle in the hot and the cold state. It had a reflection wavelength of 560 nm. (Angle of incidence and viewing angle 45°). Mechanical removal of the liquid-crystalline material obtained in this manner from the backing was accomplished by guiding the sheet over a deflecting roller 10 cm in diameter, as a result of which the crosslinked material flakes off from the support. Milling of the crosslinked, substrate-free material was carried out in a universal mill. Milling of the crosslinked polyorganosiloxanes present predominantly in the form of leaflets (size: a few millimeters to centimeters) for 5 minutes gave a pulverulent fraction. In order to narrow the particle-size distribution, the millbase was then subjected to a screening process. For this purpose the milled pigments were screened by means of an analytical screen having a mesh size of 50 μm.

EXAMPLE 2

A: Preparation of a Blue Liquid Crystal Mixture 6 g of the polyorganosiloxane were prepared as described in Example 1. This compound was dissolved in 50 ml of toluene. 2.6 g of cholesterol methacrylate (prepared as in De Visser et al., J. Polym. Sci., A 1(9), 1893 (1971) and 9 mg of aluminum cupferron (obtainable under the name Q1301 from Wako Chemicals GmbH, 4040 Neuss) were added to this solution. The toluene was then removed under vacuum at 70° C. in a rotary evaporator, to give a viscous LC composition having the following physical and thermodynamic data: glass transition temperature: 4° C., clearing point: 132° C.

B: Preparation of a Pigment 4 g of the LC composition prepared as described under A were heated to 70° C. and mixed with 0.11 g of 2-methyl-1-(4-methylthiophenyl)-2-morpholino1-propanone (obtainable under the name Irgacure 907 from Ciba Marienberg GmbH, 6140 Bensheim 1) with stirring until a homogeneous mixture was obtained. The liquid-crystalline material was processed further as described under B in Example 1—it was applied to the sheet at a temperature of 80° C. and crosslinked photochemically. The film produced on the sheet had a reflection wavelength of 400 nm. The pigments had an intensely blue color.

EXAMPLE 3

A: Preparation of a Polymerizable Monomer: 4-Ethylphenyl Methacryloyloxybenzoate A solution of 16.9 g of 4-ethylphenyl 4-trimethylsilyloxybenzoate (prepared by the procedure in EP-A-358 208, page 9, section (C) in 15 ml of toluene and 10 ml of ethanol was boiled under reflux for 1 hour and then heated at 100° C. for 60 minutes in order to remove volatile constituents. The 13.3 g of 4-ethyl phenyl 4-hydroxybenzoate which remained were dissolved, together with 30 g of methacrylic anhydride and 1.2 g of toluenesulfonic acid, in 15 ml of toluene and the solution was heated at 100° C. for 1 hour. After the solution had cooled, the product was precipitated with hexane and recrystallized from ethanol.

B: Preparation of a Red Liquid Crystal Mixture 6 g of the polyorganosiloxane prepared as in Example 1 A were dissolved in 50 ml of toluene. 1.5 g of 4-ethylphenyl methacryloyloxybenzoate (prepared as in Example 3 A) and 7.5 mg of aluminum cupferron (obtainable under the name Q 1301 from Wako Chemicals GmbH, 4040 Neuss) were added to this solution. The toluene was then removed under vacuum at 70° C. in a rotary evaporator. A viscous LC composition is produced which has the following physical and thermodynamic data: glass transition temperature: −2° C., clearing point: 124° C.

C: Preparation of a Pigment

The mixture thus obtained was treated as described in Example 2 B. The film produced on the sheet had a reflection wavelength of 630 nm. Pigments having an intensely red color are obtained.

EXAMPLE 4

A: Preparation of a Green Liquid Crystal Mixture 2.8 g of the red color mixture (prepared as described in Example 3 B), 1.2 g of the blue color mixture (prepared as described in Example 2 A) and 0.11 g of 2-methyl-1-(4-methylthiophenyl)-2-morpholino-1-propanone (obtainable under the name Irgacure 907 from Ciba Marienberg GmbH, 6140 Benhseim 1) were mixed with stirring until a homogeneous mixture was obtained. This gives a viscous LC composition having a greenish shimmer and the following thermoynamic data: glass transition temperature: 2° C., clearing point: 128° C.

B: Preparation of a Pigment

The mixture thus obtained was processed further as described in Example 2 B by applying it to a sheet at a temperature of 80° C. and crosslinking it photochemically. The film produced on the sheet had a reflection wavelength of 530 nm. Pigments having an intensely green color are obtained.

EXAMPLE 5

Pigments According to the Invention in a Water-Thinnable Coating System 1 g of the green pigments prepared as in Example 4 B were stirred into 19 g of Glemadur Glanz Klarlack [gloss clearcoat] 572 (water-thinnable wood-profile coating material, acrylic-based, from Herberts, Münster) and applied to a black-white paper card (test card 2854 from Byk Gardner, Geretsried). Even without a clearcoat layer the green-blue color flop effect is visible, which is intensified by covering with pigment-free Glemadur clearcoat.

EXAMPLE 6

Pigments According to the Invention in a Powder Coating System 10 g of the pigments prepared in Example 3 C were mixed in 100 g of polyester powder clearcoat (from DSN, Meppen) and the mixture was then applied using a manual powder gun (ESB Integral 2020, from Wagner, Meersburg) to a black-painted metal panel. Baking was carried out for 10 minutes at 180° C. Depending on the viewing angle, a brilliant color shift from red to green and vice versa could be seen.

EXAMPLE 7

Pigments According to the Invention in a Solvent-Containing Binder System (a) 1 g of the red pigments prepared as in Example 3 C was dispersed for 5 minutes with stirring in 10 g of Centari-Verdunner [thinner] (Du Pont, Mechelen). This dispersion was incorporated into a mixture of 6 g of coating material (High Solids Clear AX 1060, Du Pont) and 3 g of curing agent (High Solids Activator AK 260, Du Pont). The resulting coating formulation was applied in the form of fine droplets using a paint spray gun (from Sata-Farbspritztechnik GmbH, Ludwigsburg) to a black-primed metal panel (dimensions: 20 cm * 12 cm). After the coat had dried (2 hours, 60° C.) it was covered with a clearcoat layer consisting of 10 g of thinner, 18 g of AX 1060 and 6 g of AK 260 (Du Pont). A brilliant red color is obtained with a pronounced green color flop.

(b) 3 g of the red pigments prepared in Example 3 C were dispersed in 30 g of silicone alkyd resin clearcoat (from Wacker-Chemie GmbH, Munich) and the dispersion was applied using a 100 μm film-drawing spiral knife to a blackcoated metal panel. The panel was dried at room temperature. When the viewing angle is altered the brilliant red coloration changes to green, with individual red particles remaining visible for a long time.

EXAMPLE 8

1 g of the red pigments prepared as in Example 3 C were dispersed in 19 g of Leinö lfirniβ [linseed oil varnish] (from Akzo) and the dispersion was applied to wood which had been painted black. The coated wood was dried at room temperature. Good brilliance of color was evident, with a good color shift from red to green.

EXAMPLE 9

Pigments According to the Invention in a Coil-Coating System.

3 g of the red pigments prepared in Example 3 C were dispersed in 27 g of silicone polyester (from Wacker-Chemie GmbH, Munich)) and the dispersion was applied to a black-primed metal panel using a spiral film-drawing knife (100 μm). The drying conditions were 90 seconds at 250° C. A clear color shift from red to green was visible on the panel. The brilliance was somewhat less than formulations dried at room temperature.

EXAMPLE 10

Pigments According to the Invention in an Epoxy Resin (a) 5 parts by weight of the green pigments prepared in Example 4 B were stirred thoroughly into 95 parts by weight of Epo-tek 301 (two-park system; A:B=4:1, from Polytec GmbH, Waldbronn) and the mixture was knife-coated onto a black-primed substrate. After drying (1 hour, 65° C.), a brilliant green-blue color effect is obtained even without additional clearcoat.

(b) 3 g of the red pigments prepared in Example 3 C were dispersed in 27 g of epoxy resin solution (from Shell, Epikote 1001) and the dispersion was applied using a paint spray gun to a black-coated metal panel. After the panel had dried, a very good brilliance of color with a good color shift was evident.

EXAMPLE 11

Pigments According to the Invention in an Acrylate System 3 g of the red pigments prepared as in Example 3 C were incorporated by mixing into 27 g of acrylate resin (from Rohm and Haas) and the mixture was applied with a box knife (100 μm) to a black-primed metal panel. The baking time is 30 minutes at 150° C. Following application of a clearcoat the panel exhibits a brilliant red color which changes to green at a flatter viewing angle.

EXAMPLE 12

Pigments According to the Invention in Plastics 0.5 part by weight of the green pigments prepared as in Example 4 B were homogenized in 99.5 parts by weight of Plexiglas granules and shaped into a disk in a press at 200° C. The resulting disk is colored green with the known color flop into the blue region of the spectrum.

In order to enable comparison of different methods for the orientation of the individual pigments in a dried binder system, the green pigments according to Example 4 B were used in all of the following Examples 13 to 18.

EXAMPLE 13

Orientation of the Pigments of the Invention: Spraying of the Pigmented Coating System 1 g of the green pigments was dispersed for 5 minutes with stirring in 20 g of thinner (Permacron Supercryl, Verdünnung 3054, from Spies and Hecker, Cologne). This dispersion was added to a mixture of 50 g of coating material (Permacron MS Klarlack [clearcoat] 8010, Spies and Hecker) and 25 g of curing agent (Permacron MS Special Härter [curing agent] 3368, Spies and Hecker). The coating formulation thus obtained was applied in the form of fine droplets using a paint spray gun (from Sata-Farbspritztechnik GmbH, Ludwigsburg) to a black-primed metal panel (size 20 cm * 12 cm). After coating, the panel was pre-dried for 30 minutes at 80° C., and a clearcoat (coating formulation as described but without pigments) was applied as a protective layer. The metal panel has a brilliant green color at an almost perpendicular angle of illumination and viewing. This green color changes continuously to a blue color when the panel is illuminated and viewed at flatter angles. Even under poor light conditions the panel appears brilliant, with individual glittering color pigments.

EXAMPLES 14
Orientation of the Pigments of the Inventions: Knife-Coating of the Binder-Pigment System 1 g of the green pigments was incorporated into a high-gloss clearcoat system as described in Example 5 which was knife-coated onto black Zander paper. In this example it is possible to observe a brilliant green color with color flop into the blue region of the spectrum, the effects obtained under unfavorable light conditions being similar to those with the spray technique according to Example 13.

EXAMPLE 15
Orientation of the Pigments of the Invention: Brushing of the Binder-Pigment System 1 g of the green pigments was incorporated into 19 g of Glemadur Glanz Klarlack 572 (from Herberts, Münster) which was applied with a conventional paintbrush to a black-white paper card (test card No. 2854, from Byk Gardner, Geretsried). A brilliant color effect was obtained even without an overlying clearcoat.

EXAMPLE 16
Orientation of the Pigments of the Invention: Sprinkling of the Pigments Onto a Binder System 1 g of the green pigments was sprinkled manually onto an epoxy resin (Epo-tek 301, A:B =4:1, from Polytec GmbH, Waldbronn). A brilliant green color with blue color flop is observed.

EXAMPLE 17
Orientation of the Pigments of the Invention: Dipping of the Pigmented Coating System 1 g of the green pigments was incorporated into 19 g of Glemadur Glanz Klarlack 572 (from Herberts). A block-primed metal panel (dimensions 20 cm * 12 cm) was dipped into the pigmented coating mixture, drained and flashed off. The panel was subsequently dipped into the 2-pack clearcoat system indicated in Example 10 (Permacron, Spies and Hecker), again drained, flashed off and dried at 80° C. for 60 minutes. A green color with blue color flop is observed, the effect being somewhat less pronounced than in the case of spraying.

EXAMPLE 18
Orientation of the Pigments of the Invention: Casting of the Matrix-Pigment System 10 parts by weight of flexible PVC (obtainable from Vinnolit Kunststoff GmbH, Munich under the name Vinnol P 70 F), 50 parts by weight of bis(2-ethylhexyl)phthalate, 1 part by weight of barium-zinc stabilizer (obtainable as Irgastab BZ 505 from Ciba, Basle) and 7.5 parts by weight of the green pigments were combined, homogenized and cast onto a glass panel. After gelation for 10 minutes in a drying oven at 180° C. a transparent film is obtained which exhibits the angle-dependent color effect described.

EXAMPLE 19
Special-Effect Function of the Pigments of the Invention: a Model Car as Example In order to enable demonstration of the effects which can be achieved with the pigments according to the invention in the finishing of motor vehicles, the pigments were incorporated into a clearcoat system and applied to a model car. For this purpose 10 g of the red pigments prepared as in Example 3 C were dispersed for 5 minutes with stirring in 20 g of thinner (Permacron Supercryl, Verdünnung 3054, from Spies and Hecker, Cologne). This dispersion was added to a mixture of 50 g of coating material (Permacron MS Klarlack [clearcoat] 8010, Spies and Hecker, and 25 g of curing agent (Permacron MS Special Härter [curing agent] 3368, Spies and Hecker).

The resulting coating formulation was sprayed uniformly in the form of fine droplets using a paint spray gun (from Sata-Farbspritztechnik GmbH, Ludwigsburg) to a black-primed model car (from Bauer, Model Mercedes 300 S, year of make 1955, scale 1:18). After coating, the car was pre-dried at 80° C. for 30 minutes, and a clearcoat (coating formulation as described above but without pigments) was applied as a protective layer. Depending on the position of the light source relative to the object, continuously changing color impressions are observed over the entire spectral range between red and green at different points on the model car.

EXAMPLE 20
Special-Effect Function of the Pigments of the Invention: Skis as an Example A pair of skis is degreased and is primed in black with a colored primer (Brillux Mattlack 180 schwarz [black]) with a paint spray gun (from Sata-Farbspritztechnik GmbH, Ludwigsburg). This coat is dried, degreasing is repeated, and then a coating system consisting of green pigments according to Example 4 B and a clear basecoat as described in Example 19 is applied, the skis are flashed off, the clearcoat system presented in Example 19 is applied over the basecoat, and the skis are dried for several days at room temperature. The skis obtained exhibit color effects which glitter with brilliance and which vary greatly depending on the viewing angle, which effects are particularly highly pronounced especially in the case of high-constrast, light-colored surroundings (for example snow in the sun).

EXAMPLES 21
Special Effect-Function of the Pigments of the Invention: Tennis Rackets as an Example A tennis racket was coated by the method described in Example 20. The brilliance of the color effect observed is similar to that of the ski in Example 20.

EXAMPLE 22
Special Effect-Function of the Pigments of the Invention: a T-Shirt as an Example 20 g of the green pigments prepared as in Example 4 B were incorporated into 60 g of Lutexal HEF thickener (from BASF, Ludwigshafen), 815 g of distilled water, 5 g of Luprintol PE neu (from BASF, Ludwigshafen) and 100 g of Helizarin ET binder (from BASF, Ludwigshafen). The mixture was then applied to a black T-shirt by spreading it with a glass rod over a screen stencil laid on top of the textile article. After removal of the stencil, an intensely green color is observed with continuous color flop into the blue region of the spectrum, and text or graphics can be combined with the angle-dependent color effect.

EXAMPLE 23
Special-Effect Function of the Pigments of the Invention: Paste Coating of PVC as an Example 10 parts by weight of flexible PVC (obtainable from Vinnolit Kunststoff GmbH, Munich under the name Vinnol P 70 F), 50 parts by weight of bis(2-ethylhexyl)phthalate 1 part by weight of barium-stabilizer (obtainable as Irgastab BZ 505 from Ciba, Basle) and 7.5 parts by weight of the green pigments prepared as in Example 4 B were combined, mixed in a Turrax, applied using a knife to black cotton fabric (dimensions: 30 cm * 40 cm) in layer thicknesses of about 100 μm and dried at 180° C. for 10 minutes in a drying oven. Pieces of fabric are obtained with brilliantly glittering pigments having continuous color flop in the spectral region between green and blue.

EXAMPLE 24
Special-Effect Function of the Pigments of the Invention: coating of Paper as an Example 1 g of the red pigments prepared in Example 3 C was dispersed by stirring for 10 minutes into 19 g of a high-gloss clearcoat (Impredur Hochglanz Klarlack 784, Brillux, Münster), the dispersion was applied to black paper (Chromolux 82 g/cm², from Zanders, Bergisch-Gladbach) using a knife in layer thicknesses from 30 μm to 40 μm, and the paper was dried at room temperature. The angle-dependent, brilliant color effect of the paper coating which is obtained is comparable with that described in Example 19.

EXAMPLE 25
Special Effect Function of the Pigments of the Invention: Cardboard Packaging as an Example A black cardboard box (Chromolux 250 g/cm²) was coated with red pigments as described in Example 24. The color effect obtained is comparable with that on the black paper of the preceding example and can be increased further by adding a clearcoat (Brillux clearcoat without pigments).

EXAMPLE 26
Application of the Pigments of the Invention Using a One-Layer Structure 1 g of the green pigments prepared as in Example 4 B was dispersed in 19 g of black basecoat (Brillux Mattlack 180 schwarz [black] and the dispersion was applied, using the spray method indicated in Example 13, to a black-white paper card (test card No. 2854, from Byk Gardner, Geretsried). Owing to the high hiding power of the black basecoat the white and black areas of the paper card used are covered over equally. Individual pigments with high brilliance and a green sparkle overlay the black color impression, the color flop in the blue region of the spectrum appearing to be attenuated.

EXAMPLE 27
Application of the Pigments of the Invention in Colored Glazes Using a Two-Coat Structure (a) Dark substrate: 6 g of the green pigments prepared as in Example 4 B were first dispersed in 6 g of Verdüunner [thinner] 3363 (from Spies and Hecker, Cologne), and then 14 g of Blaulasur [blue glaze] Serie 257 (Spies and Hecker) and 7 g of Härter [curing agent] 3040 (Spies and Hecker) were added. This coating system was sprayed onto a dark gray-primed metal panel (coating with alkyd resin from Südwestchemie, Ulm), as described in Example 13, and the panel was flashed off for 10 minutes and covered with the clearcoat system used in Example 13, An intensely blue-green color of high brilliance is obtained with color flop into the blue region of the spectrum.

(b) (Comparison example) light-colored substrate: The procedure of Example 27(a) was repeated, but using a light gray-primed metal panel (substrate color: alkyd resin coating from Südwestchemie, Ulm). Owing to the restricted hiding power of the colored glaze system used, the green-blue color is attenuated, since the color effect induced by directed reflection of the pigments is overlaid, as a result of diffuse light scattering, by the undirected reflection of the lighter substrate color.

EXAMPLE 28
Pigments according to the Invention in a Three-Layer Structure 1 g of the green pigments prepared as in Example 4 B was dispersed in 1 g of Verdünnung 3054 (from Spies and Hecker, Cologne) and the dispersion is incorporated into 5 g of Klarlack [clearcoat] 8010 (Spies and Hecker) and 2.5 g of Härter [curing agent] 3368 (Spies and Hecker). Using the spray method indicated in Example 13, a black coating material (Brillux Mattlack 180 schwarz [black]) is first applied to a degreased aluminum panel such that the substrate is hidden. The pigmented basecoat system was then applied in a second spray pass.

A homogeneously green-colored surface is obtained with the characteristic blue color flop, this color impression appearing somewhat matt.

If this surface is coated as in Example 13 with a clearcoat, then, in addition, the depth effect of the transparent pigments comes into full effect, since in this case there is no disruptive, diffuse light scattering superimposed on the directed reflection of pigments. In contrast to the one-layer structure carried out in Example 26, in this three-layer structure the coated aluminum panel appears a homogeneously brilliant green with a strongly pronounced blue color flop, since no light absorbing pigments are present in the overall pigmented basecoat.

EXAMPLE 29
Pigments According to the Invention on Different-Colored Substrates (a) Red pigments on a red substrate: 1 g of the red pigments prepared as in Example 3 C was dispersed in 1 g of Verdünnung 3054 (from Spies and Hecker, Cologne) and the dispersion was incorporated into 5 g of Kiarlack [clearcoat] 8010 (Spies and Hecker) and 2.5 g of Härter [curing agent] 3368 (Spies and Hecker). A metal panel (dimensions 20 cm * 12 cm) was degreased and then coated by the method described in Example 13 with a red spray paint (Multona rot [red] 0365, from Auto-K, Gundelsheim). The pigment-binder system was applied to the color-coated panel as in Example 13 and was provided as usual with a clearcoat. The resulting panel gave a red effect when illuminated and viewed at a virtually perpendicular angle; at flatter angles various orange shades are evident, which can be explained by the overlaying of the red absorption color with the green color-flop reflection color of the pigment according to the invention, and which corresponds to the observation in FIG. 9 of the publication by Eberle et al.

(b) Red pigments on a blue substrate: if the red substrate from Example 29(a) is replaced by a blue substrate (Multona 0800, Auto-K) then the resulting panel exhibits an inverse color flop from violet colors into green-blue regions, which likewise corresponds to the observation in the publication cited in Example 29 (a).

EXAMPLE 30
Mixtures of Pigments According to the Invention With One Another 0.33 g of the blue pigments prepared as in Example 2 B, 0.33 g of the red pigments prepared as in Example 3 C and 0.33 g of the green pigments prepared as in Example 4 B were dispersed in 1 g of Verdünnung 3054 (from Spies and Hecker, Cologne) and the dispersion was incorporated into 5 g of Klarlack [clearcoat] 8010 (Spies and Hecker) and 2.5 g of Härter [curing agent] 3368 (Spies and Hecker). The clearcoat-pigment system was applied by the spray method indicated in Example 13 to a metal panel (dimensions: 20 cm * 12 cm) primed with black paint (Brillux Mattlack 180 schwarz [black]). In a second spray pass the panel was coated as described in Example 13 with a clearcoat. With light incident at an almost perpendicular angle, violet-greenish colors are obtained which change continuously into different green-blue colors at a flatter viewing angel.

EXAMPLES 31
Pigments According to the Invention, Colored With Absorption Pigments, in a Two-Coat Structure 95 g of the red liquid crystal mixture prepared as in Example 3 B, 5 g of the blue liquid crystal mixture prepared as in Example 2 A and 2.5 g of the photoinitiator Irgacure 907 (Ciba, Bensheim) are heated to 90° C. and mixed homogeneously with 1 g of Sicoflush 4120 rot [red] (BASF, Ludwigshafen) for 2 minutes using a high-speed laboratory stirrer. The finished mixture is processed further to pigments at 90° C. as described in Example 1 B. The pigments are applied as described in Example 26 to a black-white paper card. On both color areas of the paper, a red color is observed with deep gloss and color flop into orange shades.

EXAMPLE 32
Mixtures of Pigments According to the Invention and Absorption Pigments 1 g of the red pigments prepared as in Example 3 C and 0.2 g of Heliogenblau blue pigments (BASF, Ludwigshafen) were dispersed in 1.5 g of Verdünnung 3054 (from Spies and Hecker, Cologne) and the dispersion was incorporated into 5 g of Klarlack [clearcoat] 8010 (Spies and Hecker) and 2.5 g of Härter [curing agent] 3368 (Spies and Hecker). Application to a black-white paper card (test card No. 2854, Byk Gardner) gives a violet color with color flop into turquoise-green on the white and black areas of the test paper.

EXAMPLE 33
Mixtures of Pigments According to the Invention With Metallic Flakes 0.8 g of the blue pigments prepared as in Example 2 C and 0.2 g of Stapa Metallux R 8754 (Eckart-Werke, Fürth) were dispersed in 1 g of Verdünnung 3054 (from Spies and Hecker, Cologne) and the dispersion was incorporated into 5 g of Klarlack [clearcoat] 8010 (Spies and Hecker) and 2.5 g of Härter [curing agent] 3368 (Spies and Hecker). Application to a black-white paper card (test card No. 2854, Byk Gardner) gives a blue color with blue-violet flop.

EXAMPLE 34
Mixtures of Pigments According to the Invention With Interference Pigments 0.8 g of the red pigments prepared as in Example 3 C and 0.2 g of Iriodin 522 Rotbraunsatin [red brown satin] (from Merck, Darmstadt) were dispersed in 1 g of Verdünnung 3054 (from Spies and Hecker, Cologne) and the dispersion was incorporated into 5 g of Klarlack [clearcoat] 8010 (Spies and Hecker) and 2.5 g of Härter [curing agent] 3368 (Spies and Hecker). Application to a black-painted metal panel gives a brown color with a reddish-greenish shimmer.

EXAMPLE 35
Pigments According to the Invention With Different Particle Sizes Red, crosslinked polyorganosiloxanes produced in leaflet form and prepared in accordance with Example 3 B, were milled and subjected to a screening process. In order to prepare a particularly fine particle fraction a screen having a mesh size of 32 $\mu$m was used. To prepare a coarse particle fraction the polyorganosiloxane leaflets were screened first using a screen having a mesh size of 100 $\mu$m after which the oversize leaflets were screened with a screen having a mesh size of 160 $\mu$m, to give a coarse particle fraction having particle sizes of between 100 $\mu$m and 160 $\mu$m.

The two pigment fractions were sprayed separately by the method indicated in Example 13 onto a black-white paper card: in the case of the fine particle fraction a homogeneously red surface with green color flop can be seen, whereas the coarser red pigments lead to lively, glittering color effects. With a mixture of 80 parts of fine-particled and 20 parts of coarse-particled pigments the two effects are combined.

EXAMPLE 36
Color Effects of Pigments According to the Invention Whose Starting Substances Have Been Prepared Between Two Sheet Backings The orientation of cholesteric liquid-crystalline molecules can be improved if they are oriented and crosslinked not on a sheet backing but between two sheets. For this purpose pigments were prepared by analogy with the method described in Example 1 B with the difference that the liquid-crystalline material was oriented between two polyethylene terephthalate sheets. The remaining process parameters, for example layer thickness and running speed, were in accordance with Example 1 B. Since polyethylene terephthalate is transparent in the spectral region between 300 and 400 nm, UV-induced crosslinking of the oriented cholesteric molecules is possible in the same way as for the process described with one sheet backing.

EXAMPLE 37
Pigments According to the Invention in a Water-Thinnable Coating System 1 g of the green pigments prepared in this manner was incorporated by stirring into 19 g of Glemadur Glanz Klarlack 572 (water-thinnable wood-profile coating material, acrylic-based, from Herberts, Münster) and the mixture was applied to a black-white paper card (test card 2854 from Byk Gardner, Geretsried). In comparison with the color effect obtained in Example 1, the green-blue color flop is, even without a clearcoat, as highly pronounced as that obtained in Example 1 with the clearcoat, while the intensity of this color effect is almost doubled by coating with pigment-free Glemadur.

What is claimed is:

1. A pigment having a structure which is substantially that of a platelet, a thickness of from 1 $\mu$m to 20 $\mu$m and a diameter of between 500 $\mu$m and 5 $\mu$m consisting essentially of oriented three-dimensionally, crosslinked substances of a liquid-crystalline structure having a chiral phase.

2. A pigment as claimed in claim 1, wherein said pigment has a thickness of from 3 μm to 10 μm and a diameter of from 10 μm to 100 μm.

3. A pigment as claimed in claim 1, wherein the oriented three-dimensionally crosslinked substances with a liquid-crystalline structure having a chiral phase comprise organosiloxanes in which the number of polymerizable groups is at least two.

4. A pigment as claimed in claim 3, wherein the oriented three-dimensionally crosslinked substances with a liquid-crystalline structure having a chiral phase comprises at least two organosiloxanes.

5. A composition containing a pigment of claim 1.

6. A pigment as claimed in claim 1, prepared by a orienting three-dimensionally crosslinkable substances of a liquid-crystalline structure having a chiral phase, b optionally, adding other pigments, dyes or mixtures thereof, c three-dimensional crosslinking the substances of (a) and d comminuting to a desired particle size.

7. A data carrier comprising the pigment as claimed in claim 1.

* * * * *